United States Patent Office 3,318,903
Patented May 9, 1967

3,318,903
BENZAZOLYL MERCAPTOANTHRAQUINONES
Albin Peter, Binningen, Basel-Land, and Fred Mueller, Munchenstein, Basel-Land, Switzerland, assignors to Sandoz Ltd. (also known as Sandoz A.G.), Basel, Switzerland
No Drawing. Filed Oct. 1, 1964, Ser. No. 400,903
Claims priority, application Switzerland, Oct. 4, 1963, 12,265/63; Nov. 26, 1963, 14,475/63; Nov. 28, 1963, 14,582/63; May 6, 1964, 5,959/64
6 Claims. (Cl. 260—303)

This invention relates to a process for the production of new anthraquinone compounds by condensation of an anthraquinone derivative containing a halogen atom bound to the nucleus with a benzazolyl derivative containing a thiol group.

The compounds thus formed are benzazolyl mercaptoanthraquinones of the general formula

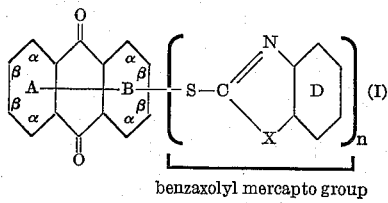

benzaxolyl mercapto group

In this formula X represent NH, O or S, and $n$ represents a low integer. The rings A, B and D may bear further preferably non-water-solubilizing substituents. It is especially advantageous for the benzazolyl mercapto groups to occupy the $\alpha$ positions of the anthraquinone molecule. Other substituents which may be present on the rings A and/or B are halogen atoms, particularly chlorine or bromine atoms, primary amino groups, secondary amino groups in which the nitrogen atom is substituted by a hydrocarbon radical, e.g. alkyl having 1 to 4 or preferably 1 or 2 carbon atoms, cycloalkyl, in particular cyclohexyl, aryl, in particular phenyl or an acyl radical, i.e. a low-molecular alkonyl radical, all of which alkyl, alkanoyl, cycloalkyl and aryl radicals may be substituted by, e.g., halogen, alkyl or alkoxy; further hydroxyl groups which may be etherified, e.g. phenyloxy groups, thiol groups or etherified thiol groups other than benzazolyl mercapto groups; substituted or unsubstituted hydrocarbon radicals, e.g., alkyl or aryl radicals, such as hydroxyphenyl, alkoxyphenyl or acyloxyphenyl radicals, e.g. acetyloxyphenyl or benzoyloxyphenyl radicals; cyano groups or sulfonic acid groups, The amino and hydroxyl groups are preferably in $\alpha$ positions, while the $\beta$ positions are preferred for halogen atoms, etherified hydroxyl groups, substituted or unsubstituted hydrocarbon radicals and cyano groups.

The ring D can also be substituted, preferably by non-water-solubilizing substituents, e.g., halogen atoms, such as those of fluorine, bromine or chlorine, nitro groups, or substituted or unsubstituted alkyl or alkoxy groups.

Particularly valuable compounds of Formula I have the formula

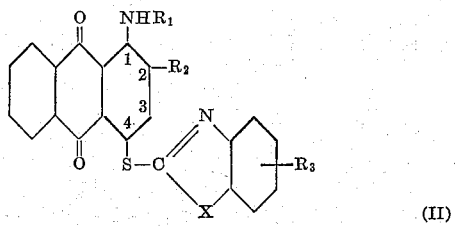

In this formula $R_1$ represents hydrogen, alkyl, particularly alkyl with 1 or 2 carbon atoms, cycloalkyl, particularly cyclohexyl, or aryl, particularly phenyl; $R_2$ represents hydrogen, halogen, particularly chlorine or bromine, or alkyl, particularly alkyl with 1 or 2 carbon atoms; $R_3$ represents hydrogen, halogen, nitro, alkyl, particularly alkyl with 1 or 2 carbon atoms, or alkoxy, particularly alkoxy with 1 or 2 carbon atoms; and X represents NH, O or S, preferably S. Here also alkyl, cycloalkyl and aryl may be substituted by the aforenamed substituents.

The method of production of the new anthraquinone compounds consists in the condensation of one mole of an anthraquinone derivative containing one or more halogen atoms bound to the nucleus, preferably in $\alpha$ positions, and having the formula

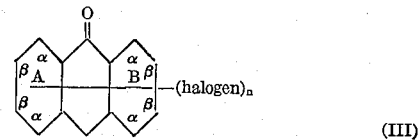

or preferably the formula

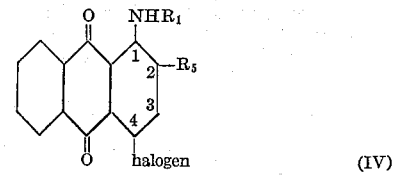

wherein $R_5$ represents the sulfonic acid group or $R_2$, with $n$ moles of benzazolyl thiol of the formula

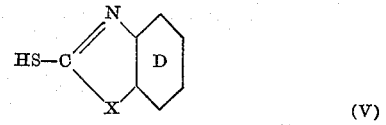

or in the condensation of an anthraquinone thiol of the formula

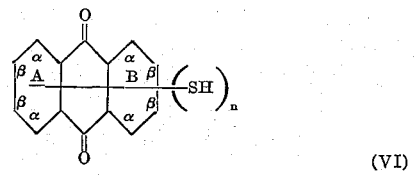

with $n$ moles of a halogenobenzazol of the formula

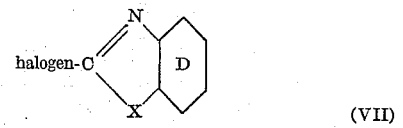

Halogen atoms of formulae (III) and (IV) which are very easy condensible are bromine atoms, but other halogen derivatives as well, e.g. chlorine derivatives, are suitable. The first method of production using compounds (III) or (IV) and (V) is preferable to the second. The condensation reaction can be carried out in the presence of water or of one or more inert organic solvents, e.g. alcohols, such as n-butanol, or ethers. Water is a very good reaction medium when the starting anthraquinone derivative contains sulfonic acid groups. The reaction is accelerated by the addition of copper or a copper compound, e.g. cuprous chloride, copper acetate or copper sulfate. Generally it is advisable to add an acid-binding agent, e.g. sodium or potassium acetate or sodium or potassium carbonate. Those starting products which contain the thiol group and/or other proton-donating groups, e.g. sulfonic acid groups, may also be reacted in the form of their salts, e.g. their alkali salts. The reaction temperature chosen may range from about 90° C. to 130° C., the preferred range being approximately 100–120° C.

The benzazolyl mercaptoanthraquinones can be isolated by precipitation, e.g. with alcohols, salting out, or distilling off the reaction medium from the reaction mixture.

The compounds thus obtained are excellent dyes and, when free from water solubilizing acid groups, are highly suitable for use as disperse dyes. For this purpose they are ground with wetting agents, emulsifiers or dispersing agents until the range of particle size is approximately 0.01 to 10 microns with the bulk of the particles between 01. and 5 microns. The resulting dyeing preparations can be used for dyeing all synthetic and semi-synthetic hydrophobic high-molecular organic fibers and the textile materials made from these fibers. Particularly good results are obtained in the dyeing of linear aromatic polyester fibers of, e.g., terephthalic acid and ethylene glycol (polyethylene terephthalate) and of secondary cellulose acetate and cellulose triacetate. The dyes can also be applied to polyamide fibers, e.g. polycondensates or polymers of adipic acid and hexamethylene diamine, ω-aminoundecanoic acid or ε-caprolactam, and to acrylonitrile polymers from aqueous dispersion at long or short liquor ratios, and also padded or printed on these fibers. For application by these methods additions of the commonly used assistants are beneficial, such as wetting, dispersing and thickening agents, emulsifiers and carriers.

The dyeings and prints are generally fixed on the substrate by the action of heat, either in the dyebath or subsequently to dyeing, padding or printing, in which case dry or wet heat can be employed. The temperatures of wet fixation in the presence of water vapor is approximately 100° to 140° C. and that of dry fixation 150° to 235° C.

The dyeings and prints have very good fastness, for instance, to light and steam, washing, water, sea water, chlorinated swimming pool water, dry cleaning, perspiration, rubbing, chlorine, peroxide, hypochlorite, cross dyeing and gas fumes. They are highly stable to pleating, heat setting and sublimation.

The parts and percentages in the examples are by weight and the temperatures in degrees centigrade.

*Example 1*

A mixture of 12 parts of 1-amino-4-bromoanthraquinone, 9 parts of 2-mercapto-benzothiazol, 8 parts of potassium carbonate, 0.2 part of finely divided metallic copper, 0.2 part of cuprous chloride and 80 parts of n-butanol is heated at 110° for 2 hours. On cooling, 100 parts of methanol are added, and the reaction product filtered off, washed with methanol and then with water, and dried. On recrystallization from chlorobenzene solution the 1-amino-4-benzothiazolyl mercaptoanthraquinone melts at 201°.

*Dying example.*—1 part of the dye produced according to Example 1 and 1 part of sodium dinaphthylmethane disulfonate are ground in 8 parts of water until a fine dispersion is obtained. This is run into a suspension of 10 parts of 2-hydroxy-1,1'-diphenyl in 300 parts of water. Into this dyebath 100 parts of a fabric of polyester fiber are entered at 40° and the bath brought to the boil in 20 minutes and held at the boil for 1 hour. The fabric is rinsed, soaped and dried. It is dyed in a brilliant red shade which is fast to washing and very fast to light, heat setting, pleating and sublimation.

The dye whose production is described in Example 1 gives in some instances faster dyeings when the 1 position is occupied by a phenylamino group instead of the primary amino group. To effect this replacement, a mixture of 10 parts of the dye of Example 1, 9 parts of anhydrous potassium acetate, 0.1 part of finely divided metallic copper, 0.1 part of cuprous chloride and 80 parts of bromobenzene is refluxed for 18 hours; on cooling 100 parts of methanol are added, the resulting 1-phenylamino-4-benzothiazolyl mercaptoanthraquinone filtered off, washed with methanol and then with water, and dried. It dyes polyester fibers in red-violet shades.

Similarly, 1-amino-4-benzothiazolyl mercaptoanthraquinone can be reacted with 1-bromo-4-methylbenzene, 1-bromo-2-methylbenzene or 1-bromo-4-methoxybenzene; 1-amino-4-benzoxazolyl mercaptoanthraquinone with 1-bromo-2,4,6-trimethylbenzene or bromobenzene; 1-amino-4-benzothiazolyl-mercapto-2-methylanthraquinone with 1-bromo-4-methoxybenzene; 1-amino-4-benzimidazolyl-mercapto-2-bromoanthraquinone with 1-bromo-2,4-dimethylbenzene; or 1-amino - 4 - benzimidazolyl-mercapto-2-methylanthraquinone with 1-bromo - 2,4 - dimethylbenzene, and, more generally, a primary amino group in an aminobenzazolyl mercapto-anthraquinone can be converted into a secondary amino group, preferably by condensation with an aryl halide, e.g. unsubstituted bromobenzene or bromobenzene substituted by alkyl, alkoxy or halogen. This condensation reaction can be carried out in the known way in an inert liquid or in an excess of the aryl halide used and in the presence of copper or a copper compound and an acid-binding agent at about 140–180°, or, if preferred, a previously N-substituted aminohalogenoanthraquinone can be reacted with a benzazolyl thiol.

*Example 2*

A mixture of 10 parts of 1-amino-2,4-dibromoanthraquinone, 7 parts of 2-mercaptobenzothiazol, 6 parts of potassium carbonate, 0.2 part of finely divided metallic copper, 0.2 part of cuprous chloride and 80 parts of n-butanol is heated at 110–112° for 45 minutes. On cooling the crystalline 1-amino-4-benzothiazolyl-mercapto-2-bromoanthraquinone is filtered off, washed with methanol and then with hot water, and dried. The dye melts at 226–228°. It dyes polyester fibers in brilliant scarlet shades that have excellent fastness to light, wet treatments, sublimation and heat setting.

*Example 3*

A mixture of 12 parts of 4-bromo-1-methylaminoanthraquinone, 10.5 parts of 2-mercaptobenzothiazol, 10.5 parts of potassium carbonate, 0.2 part of finely divided metallic copper, 0.2 part of cuprous chloride and 100 parts of n-butanol is heated at 110° for 1 hour. On cooling, the reaction product is filtered off and washed as given in Example 1. A dye is obtained which dyes polyester fibers in brilliant red-violet shades having very good light, wet and sublimation fastness.

*Example 4*

When the 10.5 parts of 2-mercaptobenzothiazol in the reaction mixture used in Example 3 are replaced by 10.5 parts of 2-mercaptobenzoxazol, or 10.5 parts of 2-mercaptobenzimidazol, 4-benzazolyl-mercapto-1-methylaminoanthraquinone or 4 - benzimidazolyl - mercapto - 1 - methylaminoanthraquinone, respectively, is obtained. Both compounds are red and possess similar properties to those of the dye disclosed in Example 3.

*Example 5*

A mixture of 12 parts of 1-amino-4-bromo-2-methylanthraquinone, 10.5 parts of 2-mercaptobenzothiazol, 10.5 parts of potassium carbonate, 0.2 part of finely divided metallic copper, 0.2 part of cuprous chloride and 100 parts of methanol is heated at 105° for 2 hours. The dye is isolated as in Example 2. It dyes polyester fibers in brilliant red shades having very good fastness properties.

*Example 6*

A mixture of 15 parts of 4-bromo-1-(2',6'-dibromo-4'-methyl)-phenyl-amino-anthraquinone, 6 parts of 2-mercaptobenzothiazol, 6 parts of potassium carbonate, 0.2 part of finely divided metallic copper 0.2 part of cuprous chloride and 100 part of butanol is heated at 110° for 3 hours. After cooling, the reaction product is filtered off, washed with methanol and then with water, and dried. 4 - Benzothiazolyl - mercapto - 1 - (2',6' - dibromo - 4'-methyl)phenylaminoanthraquinone is obtained, which dyes polyester fibers in brilliant red shades.

In the following Table 1 are listed the starting compounds of further dyes which can be produced by the procedures set forth in Examples 1 to 6. The number of the example is given in column I; the anthraquinone derivative used, in column II; the mercaptobenzazol used, in column III; and the color of the dye in chlorobenzene solution, in column IV.

tassium carbonate, 0.5 part of copper sulfate and 100 parts of n-butanol is heated at 115° for 20 hours. On cooling the product, 4-benzothiazolyl-mercapto-1-hydroxyanthraquinone is precipitated; it is filtered off, washed with methanol and then with water, and dried.

The identical dye is obtained when 39 parts of the 1-amino-4-benzothiazolylmercaptoanthraquinone obtained

TABLE 1

| I | II | III | IV |
|---|---|---|---|
| 7 | 1-amino-4-bromoanthraquinone | 5-chloro-2-mercaptobenzothiazol | Red. |
| 8 | ----do---- | 5-bromo-2-mercaptobenzoxazol | Red. |
| 9 | 1-amino-4-chloroanthraquinone | 2-mercaptobenzoxazol | Red. |
| 10 | ----do---- | 5-chloro-2-mercaptobenzimidazol | Red. |
| 11 | 1-amino-2,4-dibromoanthraquinone | 2-mercapto-6-nitrobenzothiazol | Red. |
| 12 | ----do---- | 2-mercapto-6-nitrobenzoxazol | Red. |
| 13 | 1-amino-2,4-dichloroanthraquinone | 2-mercapto-5-methylbenzothiazol | Red. |
| 14 | ----do---- | 6-ethoxy-2-mercapto-benzothiazol | Red. |
| 15 | 1-amino-4-bromo-2-methylanthraquinone | 2-mercapto-6-methoxybenzothiazol | Red. |
| 16 | ----do---- | 2-mercapto-4-methylbenzothiazol | Red. |
| 17 | 4-bromo-1-methylaminoanthraquinone | 2-mercapto-5-methylbenzoxazol | Red-violet. |
| 18 | ----do---- | 2-mercapto-4-methylbenzimidazol | Do. |
| 19 | ----do---- | 2-mercapto-7-methylbenzothiazol | Do. |
| 20 | ----do---- | 5-ethyl-2-mercaptobenzothiazol | Do. |
| 21 | ----do---- | 6-chloro-2-mercaptobenzothiazol | Do. |
| 22 | 1-ehtylamino-4-bromoanthraquinone | 2-mercapto-6-methylbenzothiazol | Do. |
| 23 | ----do---- | 2-mercapto-5-methylbenzimidazol | Do. |
| 24 | 4-bromo-1-n-propylaminoanthraquinone | 5-chloro-2-mercaptobenzoxazol | Do. |
| 25 | 4-bromo-1-iso-propylaminoanthraquinone | 2-mercapto-6-methoxybenzothiazol | Do. |
| 26 | 4-bromo-1-n-propylaminoanthraquinone | 6-n-butoxy-2-mercaptobenzothiazol | Do. |
| 27 | 4-bromo-1-phenylamino-anthraquinone | 2-mercaptobenzothiazol | Do. |
| 28 | ----do---- | 2-mercapto-benzimidazol | Do. |
| 29 | 4-bromo-1-(4′-methoxy)-phenylaminoanthraquinone | 2-mercaptobenzothiazol | Do. |
| 30 | 4-bromo-1-(4′-methoxy)-phenylamino-anthraquinone | 2-mercapto-6-methylbenzoxazol | Do. |
| 31 | 4-bromo-1-(2′,4′,6′-trimethyl)-phenylaminoanthraquinone | 2-mercaptobenzoxazol | Do. |
| 32 | 4-bromo-1-(4′-methyl)-phenylaminoanthraquinone | 5-bromo-2-mercaptobenzimidazol | Do. |

*Example 33*

A mixture of 15 parts of 1-amino-2-bromo-4-hydroxyanthraquinone, 10 parts of 2-mercaptobenzothiazol, 2 parts of potassium carbonate, 4 parts of anhydrous sodium acetate and 140 parts of chlorobenzene is heated at 125° for 48 hours. On cooling to 80°, 3 parts of 100% acetic acid in 100 parts of ethanol are added. The precipitated dye, 1-amino-2-benzothiazolyl-mercapto-4-hydroxyanthraquinone, is filtered off cold and purified by recrystallization from chlorobenzene solution. It dyes polyester fibers in bordeaux shades; the dyeings have very good fastness to light, water and heat fixation.

according to Example 1 are dissolved in 350 parts of 93% sulfuric acid, the solution cooled to 10°, 7 parts of sodium nitrite strewn in, the solution stirred for 1 hour at 10–15°, then heated to 135° and after 3 hours at this temperature run into 1500 parts of ice-water. The product is filtered off, washed until neutral and dried. It dissolves in chlorobenzene to give orange solutions.

Table 2 below gives particulars of further examples of hydroxyanthraquinones which can be produced according to the procedure of Example 35. In column I the number of the example is given, in column II the hydroxyanthraquinone used as starting product, in column III the mercaptobenzazol used for the reaction and in column IV the color of the dye in chlorobenzene solution.

TABLE 2

| I | II | III | IV |
|---|---|---|---|
| 36 | 4-chloro-1-hydroxyanthraquinone | 2-mercaptobenzoxazol | Orange. |
| 37 | ----do---- | 2-mercaptobenzimidazol | Do. |
| 38 | 4-chloro-1-hydroxy-2-methylanthraquinone | 2-mercapto-6-methylbenzothiazol | Do. |
| 39 | ----do---- | 2-mercapto-5-methylbenzoxazol | Do. |
| 40 | 2,4-dichloro-1-hydroxyanthraquinone | 5-chloro-2-mercaptobenzimidazol | Do. |
| 41 | ----do---- | 5-bromo-2-mercaptobenzimidazol | Do. |
| 42 | 2,4-dibromo-1-hydroxyanthraquinone | 2-mercapto-6-methoxybenzothiazol | Do. |
| 43 | ----do---- | 6-ethoxy-2-mercaptobenzoaxazol | Do. |

*Example 34*

A mixture of 2-bromo-1,4-dihydroxyanthraquinone, 10 parts of 2-mercaptobenzothiazol, 6 parts of potassium carbonate and 120 parts of 1,2-dichlorobenzene is heated at 135–140° for 4 hours. On cooling to 20°, 12 parts of 100% acetic acid in 150 parts of methanol are added. The 2-benzothiazolyl-mercapto-1,4-dihydroxy-anthraquinone formed is filtered off, washed with methanol and then with water, and dried. The dye melts at 222° and dyes polyester fibers in brilliant orange shades of good fastness.

*Example 35*

A mixture of 10 parts of 4-chloro-1-hydroxyanthraquinone, 9 parts of 2-mercaptobenzothiazol, 7 parts of po-

*Example 44*

202 parts of sodium 1-amino-4-bromoanthraquinone-2-sulfonate and 100 parts of 2-mercaptobenzothiazol are suspended in 900 parts of water. To the suspension are added 70 parts of sodium carbonate, 2 parts of finely divided metallic copper and 2 parts of cuprous chloride, and it is then heated at 100° for 14 hours, after which 45 parts of sodium chloride are added. On cooling, the reaction product is filtered off, washed with 3% sodium chloride solution and dried. 240 parts of sodium 1-amino-4 - benzothiazolyl-mercaptoanthraquinone - 2-sulfonate are obtained.

4-benzothiazolyl - mercapto-1,5-dihydroxy - anthraquinone-2,6-disulfonate and 4-benzothiazolyl-mercapto-1,8- dihydroxy-2,6-disulfonate can be produced in the previously described way.

When a sulfonic acid is employed as anthraquinone derivative of formula (III) or (IV), as in the procedure of Example 44, the sulfonic acid group in the resulting benzazolyl-mercaptoanthraquinone-sulfonic acid must be split off if the final compounds are intended for use as pigments or disperse dyes. This can be effected with very good success by heating at about 110–130° in solution in concentrated sulfuric acid or by treatment with sodium dithionite in aqueous ammonia at a moderately high temperature, e.g. about 40–70°, followed by the introduction of a jet of air at about the same temperature until cleavage is complete.

Thus, for instance, the 240 parts of sodium 1-amino-4-benzothiazolyl-mercapto-anthraquinone-2-sulfonate obtained according to Example 44 can be added to 650 parts of 93% sulfuric acid, and 153 parts of water added dropwise, the temperature being kept below 50°. After the addition it is raised to 120°, this temperature maintained for 4 hours, the mass then run into 3000 parts of ice-water and the reaction product filtered off, 1-amino-4-benzothiazolyl-mercaptoanthraquinone is obtained.

The same method can be employed for producing 4-benzothiazolyl-mercapto-1-hydroxyanthraquinone from 4-benzothiazolyl-mercapto-1 - hydroxyanthraquinone-2-sulfonic acid, 4-benzothiazolyl-mercapto-1,5-dihydroxyanthraquinone from 4-benzothiazolyl - mercapto-1,5-dihydroxyanthraquinone-2,6-disulfonic acid, or 4-benzothiazolyl-mercapto-1,8-dihydroxyanthraquinone from 4-benzothiazolyl-mercapto - 1,8 - dihydroxyanthraquinone-2,6-disulfonic acid; similarly, 4-benzazolyl-mercapto--1,5-diamino- and 4-benzazolyl - mercapto-1,8-diamino-anthraquinone can be obtained from the corresponding 4-bromo-1,5-diamino- and 4-bromo-1,8-diamino - anthraquinone-2,6-disulfonic acids by reaction with a benzazolyl thiol and subsequent cleavage of the two sulfonic acid groups.

A number of specially preferred dyestuffs of the present invention have the following formulae:

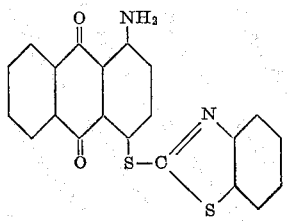

Example 1

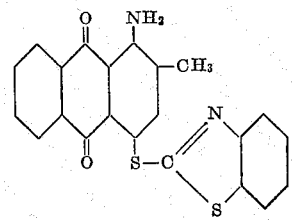

Example 3

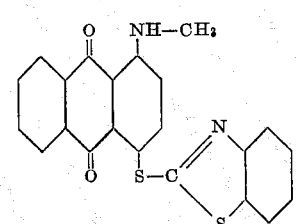

Example 5

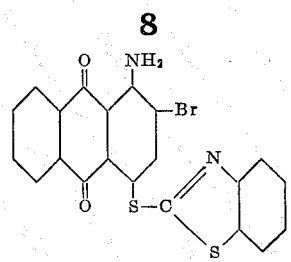

Example 2

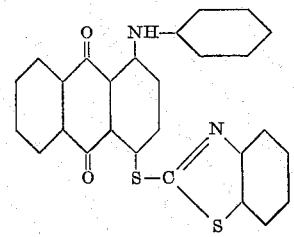

Example 1

Having thus disclosed the invention what we claim is:
1. Benzazolyl mercaptoanthraquinones of the formula

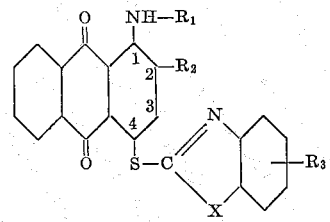

(II)

wherein

R$_1$ represents a member selected from the group consisting of hydrogen, low molecular alkyl, cyclohexyl, phenyl, halogenophenyl, low molecular alkylphenyl and low molecular alkoxy-phenyl.

R$_2$ represents a member selected from the group consisting of hydrogen, halogen and low molecular alkyl, R$_3$ represents a member selected from the group consisting of hydrogen, halogen, nitro, low molecular alkyl and alkoxy and X represents a member selected from the group consisting of NH, O and S.

2. The benzazolyl mercaptoanthraquinone of the formula

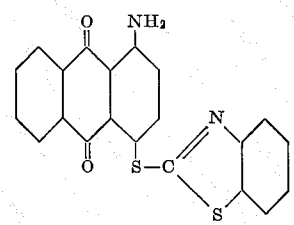

3. The benzazolyl mercaptoanthraquinone of the formula

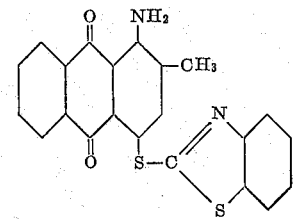

4. The benzazolyl mercaptoanthraquinone of the formula

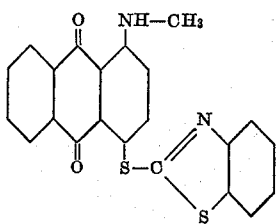

5. The benzazolyl mercaptoanthraquinone of the formula

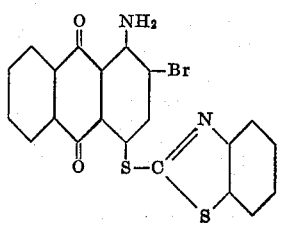

6. The benzazolyl mercaptoanthraquinone of the formula

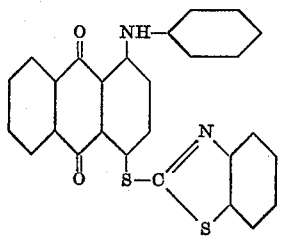

References Cited by the Examiner

UNITED STATES PATENTS

| | | | |
|---|---|---|---|
| 2,899,438 | 8/1959 | Jenny | 260—303 |
| 2,987,496 | 6/1961 | Simpson | 260—40 |
| 3,026,283 | 3/1962 | Schlegel et al. | 260—40 |
| 3,185,698 | 5/1965 | Koch et al. | 260—303 |

OTHER REFERENCES

Fieser and Fieser: Advanced Organic Chemistry, Reinhold, pp. 312–13.

Ullmann et al.: Berichte, vol. 49 (1916), pp. 2154–2163.

ALEX MAZEL, *Primary Examiner.*

HENRY R. JILES, *Examiner.*

RICHARD J. GALLAGHER, *Assistant Examiner.*